United States Patent [19]

Bossen

[11] 4,319,357
[45] Mar. 9, 1982

[54] DOUBLE ERROR CORRECTION USING SINGLE ERROR CORRECTING CODE

[75] Inventor: Douglas C. Bossen, Poughkeepsie, N.Y.

[73] Assignee: International Business Machines Corp., Armonk, N.Y.

[21] Appl. No.: 103,633

[22] Filed: Dec. 14, 1979

[51] Int. Cl.³ .......................................... G06F 11/10
[52] U.S. Cl. .................................................. 371/38
[58] Field of Search .................... 371/37, 38; 364/200, 364/900

[56] References Cited

U.S. PATENT DOCUMENTS

| | | | |
|---|---|---|---|
| 3,656,107 | 4/1972 | Hsiao et al. | 371/37 |
| 4,100,403 | 7/1978 | Eggenberger et al. | 371/38 |
| 4,139,148 | 2/1979 | Scheuneman et al. | 371/38 |
| 4,163,147 | 7/1979 | Scheuneman et al. | 371/38 |
| 4,175,692 | 11/1979 | Watanabe | 371/38 |
| 4,209,846 | 6/1980 | Seppa | 371/38 |

Primary Examiner—Charles E. Atkinson
Attorney, Agent, or Firm—James E. Murray

[57] ABSTRACT

A single error correcting double error detecting (SEC/DED) error correcting code for a memory is used to correct one fixed error and one transitory error in a data word stored in the memory. The erroneous data word and syndrome generated therefrom by the error correcting code circuitry are saved while the memory location of the flawed word is checked to determine the location of the one fixed error using a ancillatory error correction technique. A syndrome is then generated for the word assuming only a single fixed error in the location determined using the ancillatory technique. Thereafter, the generated and saved syndromes are exclusive OR'd together to obtain another syndrome locating the position of the transitory error. With both errors located, the word is corrected by inverting the erroneous data bits.

3 Claims, 6 Drawing Figures

FIG. 2

FIG. 4 TEST PATTERNS FOR THE (72,64) CODE OF FIG. 2

DOUBLE ERROR CORRECTION USING SINGLE ERROR CORRECTING CODE

BACKGROUND OF THE INVENTION

The present invention relates to the correction of errors in stored data using single error correcting, double error detecting (SEC/DED) code and more particularly, it relates to correcting a double error consisting of one fixed error and one transitory error using an SEC/DED code.

Errors in data stored in memories can be said to have two major causes. One cause is the intrinsic physical failure of memory components which usually produces a permanent or "hard" error. The other cause is non-destructive environmental phenomena which causes errors which for the most part are transient, intermittent or "soft" errors. In present day monolithic memory chips, soft errors due to external or environmental interference, are more prevalent than hard errors resulting from component failures. Laboratory evidence shows that the alpha-particle induced failure rate alone is one to two orders of magnitude higher than the memory chips basic intrinsic failure rate. Furthermore, alpha-induced failure rates usually are higher at higher chip densities indicating that soft errors will be of even greater significance in the future.

Error correcting codes have traditionally been used in improving reliability in the storage area of computers. In the semiconductor memory area, the most widely used codes are single error correcting and double error detecting SEC/DED codes. This class of codes is most effective in memory systems organized on a one bit per card, chip or module basis. With the one bit per card, chip or module organization, multiple errors caused by the failure of a card, chip or module will only cause a single bit error in any encoded data word. The mapping of component failures into single bit errors has resulted in the use of delayed system maintenance procedures that allow component failures to accumulate to some threshold level before they are repaired or replaced. This is done under the assumption that the errors caused by the component failures will be corrected by the SEC/DED error correction system. However, with the high levels of soft errors found in modern semiconductor memories, these system maintenance strategies cause a high uncorrectable error (UE) rate as a result of double errors caused by the lining up of a hard error from a component failure with a soft error resulting from alpha particle bombardment. To reduce the number of uncorrectable errors, maintenance strategies could be altered so that fewer component failures are allowed to accumulate. This of course causes higher replacement rates for storage components, and thus higher parts and service costs. Alternatively double error correcting (DEC) codes could be substituted for the SEC/DED codes to correct multi-bit errors resulting from the lining up of a hard error with a soft error. However this would require greater redundancy in the encoded data words and more complex encoding and decoding circuits. Therefore, both these solutions exact a heavy overhead burden and should not be resorted to unless absolutely necessary.

In the past single error double detecting error codes have been used to correct more than one error. For instance, U.S. Pat. No. 3,656,107, suggests that bits in the data word with the double error be changed one after another until the syndrome indicates that the double error is eliminated. Then a new syndrome is generated to locate the single remaining error. In addition, U.S. Pat. No. 4,139,148 describes correcting double bit errors using a SEC/DED code by saving of previously occurring single error syndromes and using them to correct one error bit when double bit error occurring in the same word in storage. Furthermore, it has been suggested that an error correction scheme which involves saving the data word and syndrome when the data word contains too many errors for the error correcting code to correct. The memory location where the data word was stored is then checked using ancillary correction means to locate stuck bits in the data word location. A syndrome is thereafter generated for a data word with stuck bits in the positions located by the ancillary process. If this syndrome matches the stored syndrome the word is corrected by inverting the data bits in the stored data word at the stuck bit positions. If it doesn't the suggestion is that the actual bits among the faulty bits in error can be determined by "iterative partitioning" of the faulty bits and determining the error syndrome for each portion.

THE INVENTION

In accordance with the present invention, a new error correcting scheme is provided for using a SEC/DED code to correct a two bit error where one of the errors is a hard error and the other is a soft error. Whenever a double error is indicated, the data word containing the error and syndrome generated from that word are saved while the location in storage where the data word was stored is tested using an ancillary error correction technique to locate the one hard error. Then a syndrome is generated for the flawed word assuming only a single hard error in the location determined by the ancillary technique. The generated syndrome is then exclusive OR'd with the saved double error syndrome to obtain a third syndrome locating the position of the transitory error. The saved data word is thereafter corrected by inverting data bits in the calculated locations.

Therefore, it is an object of the present invention to provide a new means of correcting two errors.

It is another object of the present invention to correct one transitory and one hard error using a single error correcting double error detecting code.

THE DRAWINGS

These and other objects of the present invention will be better understood in reference to reading the following description of the preferred embodiment as shown in the accompanying drawings.

FIG. 2 is a matrix for a single error correcting double error detecting code.

FIG. 4 is a table of the test patterns for locating a hard error.

FIG. 5 is a table of valid single error locators generated from the test patterns of FIG. 4.

DETAILED DESCRIPTION

Figure 1:
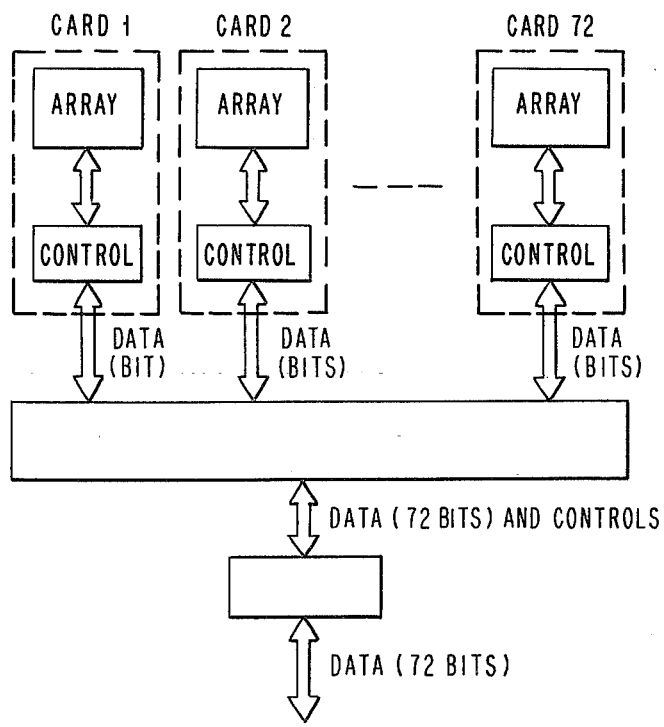
FIG. 1 illustrates a bit per card organization for a memory.

As shown in FIG. 1, in a bit-per-chip word organized memory, any single or multi bit failure associated with one chip is correctable using a single error correcting double error detecting code. This is because all the errors on a single chip are located in one bit position of a data word protected by the code.

Figures 2, 4:
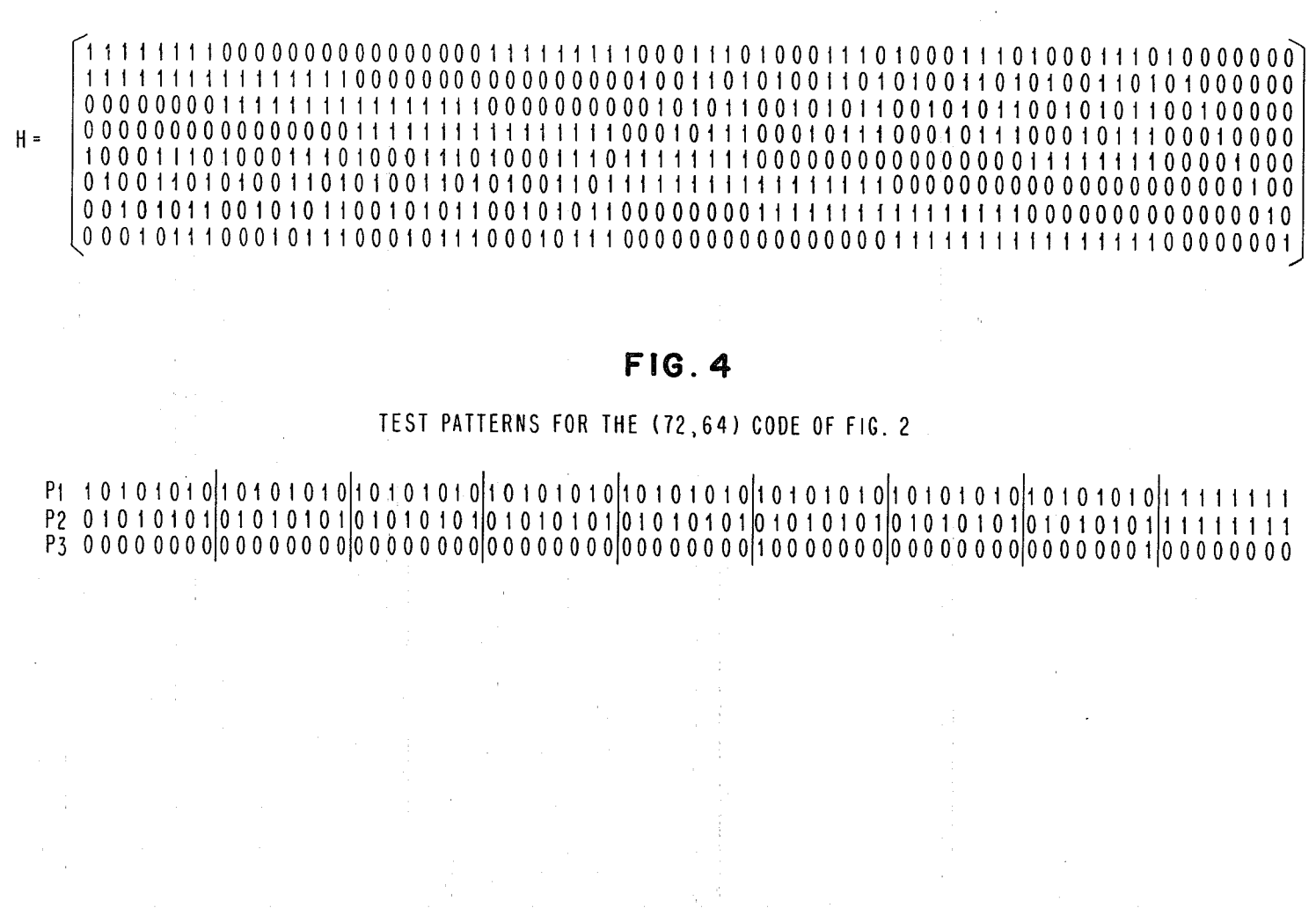

FIG. 2 is a matrix for a SEC/DED code for protecting a data word of 64 data bits with 8 check bits. Its basic properties and implementation are described in U.S. Pat. No. 3,623,155. With an error indication and a match in one of the columns of the matrix in FIG. 2 a single error is assumed in the matched column's bit position. If there is an error indication and no match in any column of the matrix an Uncorrectable Error (UE) has been detected. Likewise, an error indication with an even number of 1's in the 8 check bits of the matrix indicates an even number of errors which is an uncorrectable error condition with the particular code.

In the three cases stated above, only the last two cause an uncorrectable error. Since the memory is arranged as in FIG. 1, errors are assumed to be statistically independent. Therefore, it can be validly assumed that within a given code word double bit errors are much more likely to happen than triple, quadruple or higher multiple bit errors. Making this assumption, let h be the bit location of the "hard" error where $0 \leq h \leq 71$ and let $\alpha$ be the bit location of the "soft" error where $0 \leq \alpha \leq 71$ and $\alpha \neq h$. Then $$S_u = S_h \forall S_\alpha \qquad (1)$$

where $S_u$ is the syndrome for the data word with the uncorrectable double error and $S_h$ and $S_\alpha$ are the syndromes for the same data word with correctable single errors in locations h and $\alpha$ respectively.

Figure 3:
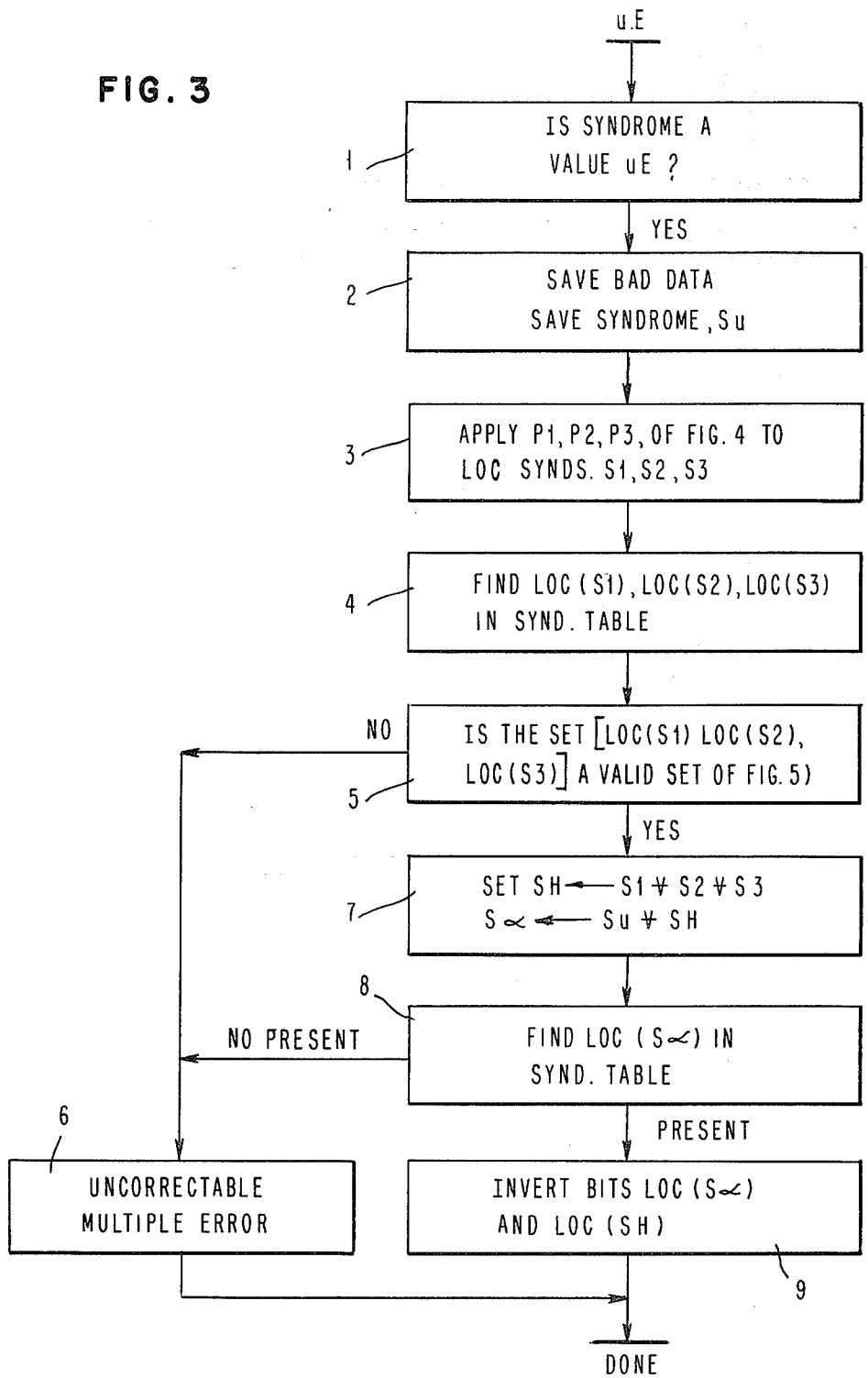
FIG. 3 is a flow diagram for embodiment of the invention.

As shown in FIG. 3, formula (1) can now be used to correct those double bit errors made up of one hard error and one soft error. When the ECC hardware detects 1 an uncorrectable error condition in an encoded data word stored in some location in memory, that encoded data word is saved 2 along with the syndrome generated by the ECC hardware from that encoded word.

Exerciser diagnostic patterns shown in FIG. 4 are then used to locate the bit position of the hard error by interrogating 3 the memory location. Each of the patterns $P_1$, $P_2$ and $P_3$ is written into the location and read out of the location. Syndromes $S_1$, $S_2$ and $S_3$ are generated from the read out data. Each of these three syndromes is decoded 5 by the ECC circuitry to determine the locations (LOC) of any bits in error. If there is no valid single error syndrome among the three syndromes or if the syndromes $S_1$, $S_2$ and $S_3$ are inconsistent, or in other words if the set of locations Loc ($S_1$), Loc ($S_2$) and Loc ($S_3$) obtained from the three syndromes is not one listed in FIG. 5, the correcting scheme is terminated 6 and a true uncorrectable error condition is indicated.

If the set of locations Loc ($S_1$), Loc ($S_2$) and Loc ($S_3$) obtained from the three syndromes $S_1$, $S_2$ and $S_3$ is consistent, that is they are identical to a set listed in FIG. 5. It is assumed that that bit position indicated by the set is the bit location h of the hard error. The syndrome $S_h$ is then generated 7 assuming one error in bit position h and then the syndrome $S_\alpha$ is calculated by Exclusive ORing the stored syndrome $S_u$ with the computed syndrome $S_h$ or $S_\alpha = S_u \forall S_h$.

The final consistency test 8 is checking syndrome $S_\alpha$ to determine if it is a valid single error syndrome. If it is, the bit position $\alpha$ of the soft error is known and the stored word can be corrected by inverting 9 the bits at locations $\alpha$ and n. If not, an indication is given that a true uncorrectable error condition exists.

Figure 6:
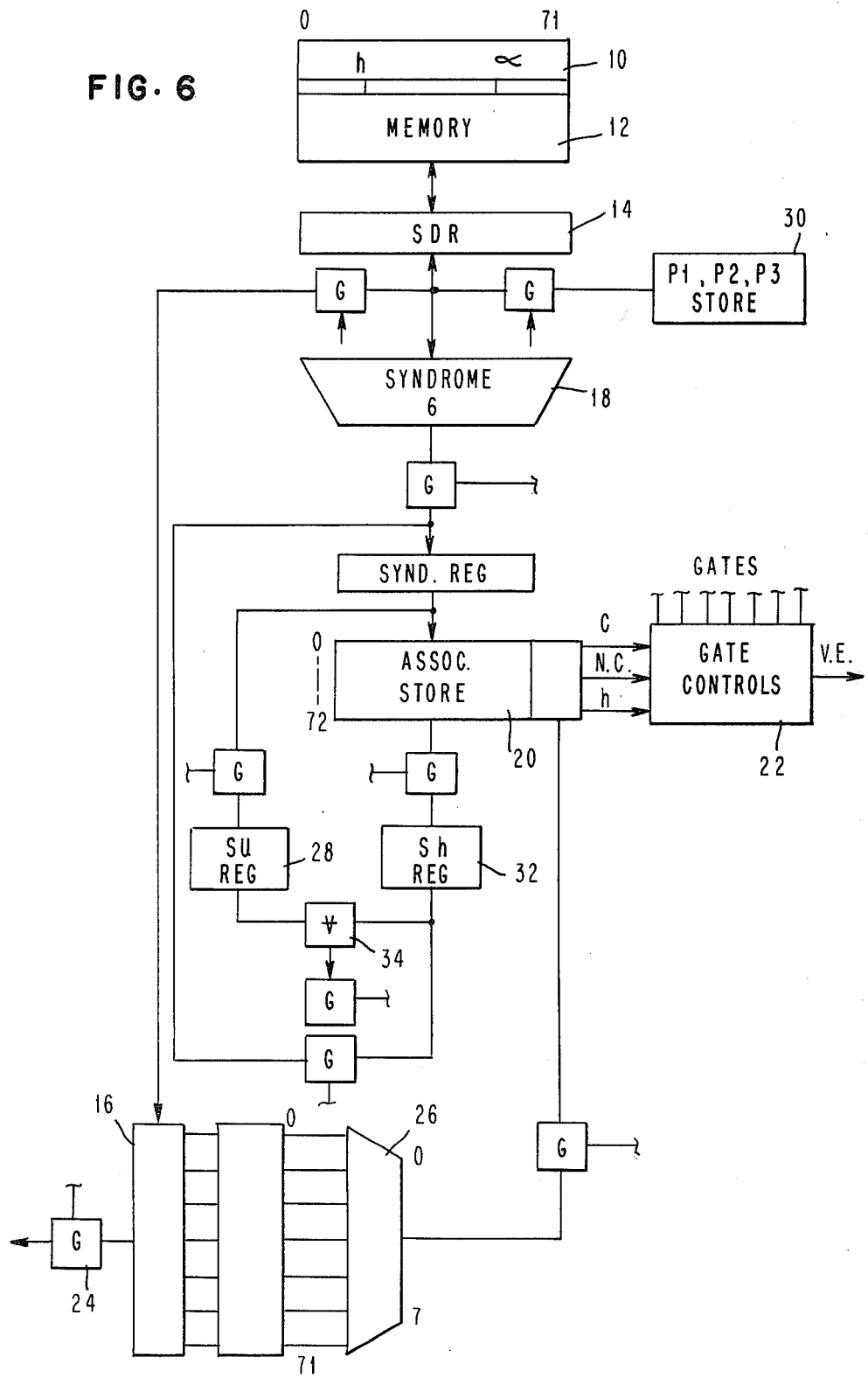
FIG. 6 is a schematic of an implementation of the flow diagram of FIG. 3.

The apparatus for doing this is shown in FIG. 6. As shown, a word 10 accessed from the memory 12 into storage data register 14, is transmitted to an output register 16 and to a syndrome generator 18. The syndrome generator 18 generates a syndrome which is fed to an associative store 20. The associative store 20 is a 73 word memory storing each of the syndromes for a single bit in error at any one of the 72 bit locations of the word plus the syndrome for no bits in the word in error. Stored along with the syndrome is a 7 bit number identifying the position of the bit error in binary sequence. When an inter-rogation of the table 20 results in a match condition the stored syndrome and the 7 bit binary number identifying the bit position in error are read from the associative store.

Assume that the syndrome generator 18 produces a syndrome of all zeros, or in other words, a syndrome which indicates no bits in the accessed word are in error. Stored along with the syndrome in associative store with the all zero syndrome would be a string of seven additional zeros indicating that there is no error. This string of seven zeros is fed to a controller 22 which then generates a gate signal for gate 24 allowing the error free data word stored in register 16 to be transmitted to the processor. Again, assume that the syndrome generator generates a syndrome $S_h$ that would indicate that a single bit error has occurred. Since all the syndromes identifying single bit errors are stored in the table 20, inter-rogating with the syndrome $S_h$ results in the syndrome $S_h$ and the location h of the bit in error in 7 bit binary notation being read out of the associative store 20. The seven bit binary location of the bit in error is fed to the decoder 26 which informs the bit inverter 27 of the particular bit h in error causing the inverter to correct the bit by inverting that bit in the word stored in the output registers 16. The controller then opens the gate 24 to transmit the corrected word to the processor.

Finally, assume now that a syndrome generator 18 generates a syndrome $S_h$ that does not match with any of the 73 syndromes stored in the associative store 20. Associative store 20 then generates a no compare signal C and feeds it to the error control 22. Upon receipt of a no compare signal, the error control 22 stores the uncorrectable error syndrome in the SU register 28. It also transmits the test words $P_1$, $P_2$ and $P_3$ from the store 30 to the storage data register 14 for reading into the flawed storage location 10. As each of these words is read into the memory 12 and then read out, the syndrome generator 18 generates the appropriate one of the syndromes $S_1$, $S_2$ and $S_3$ when one of the syndromes $S_1$, $S_2$, $S_3$ is received by the associative store 20 from the syndrome generator 18 the associative store generates a compare or a no compare signal and with a compare signal, an error location. If there is three no compare signals, the error control terminates the error correction process and indicates an uncorrectable error condition exists. Likewise, if the compare signals generated for two or more of the syndromes $S_1$, $S_2$ and $S_3$ point to different bits in error the controller 20 terminates the error correction process and indicates a true uncorrectable error condition exists. However, if the interrogations by the syndromes $S_1$ $S_2$ and $S_3$ result in a set of memory locations Loc ($S_1$), Loc ($S_2$) and Loc ($S_3$) listed in the table of FIG. 5 the error controller loads the syndrome $S_h$ for the location identified by the three syndromes into the $S_h$ register 32 and then feeds the contents of both registers 28 and 32 into Exclusive OR circuit 34 to perform an Exclusive OR function of the two syndromes $S_u$ and $S_h$. The output $S_\alpha$ of the Exclusive OR circuit 34 is fed back into the associative store 20 to determine if it matches any of the syndromes stored in the associative store 20. If it does not, a no compare signal is generated by the associative store 20 and fed to the controller 22 which then terminates the error correction process and indicates a true uncorrectable error condition exists. If it does, the error controller receives a compare signal and the location $\alpha$ of the bit in error is transmitted to the decoder from the store in 7 bit binary notation to invert the data in bit location of the register 16. The syndrome $S_h$ is then fed from register 32 to the store 20 which feeds the location of bit h to the decoder 26. The decoder 26 then instructs the bit inverter 26 to invert the bit h. The data stored in register 16 is now correct and the controller 22 opens the gate 24 and transmits the data to the processor.

Having thus described our invention, what we claim as new, and desire to secure by Letters Patent is:

1. In an error correcting system for a memory using a ECC code capable of correcting a single error and detecting a double error, a method for correcting a word which has one fixed error and one transitory error comprising the steps of:
   (a) saving the data and syndrome generated by the ECC code circuitry for said word;
   (b) determining the location of said one hard error using an ancillary error location technique;
   (c) generating a syndrome for said word assuming only a single error in the location determined by (b);
   (d) exclusive ORing the syndrome generated by step (c) with the syndrome stored in step (a) to obtain the syndrome locating the position of the transitory error;
   (e) correcting the transitory errror.

2. The method of claim 1 including,
   checking the results of the exclusive ORing in step (d) to see if it results in a single error syndrome prior to correcting the transitory error.

3. The method of claim 2 including,
   storing all possible single error syndromes in a table;
   using this table in step (b) to determine the location of the one hard error, in step (c) to generate the syndrome for the word with only a single error in the location determined by (b) and in claim 2 to check the exclusive ORing of step (d).

* * * * *